(12) United States Patent
Prakash et al.

(10) Patent No.: US 10,054,994 B2
(45) Date of Patent: Aug. 21, 2018

(54) NON-UNIFORM INTENSITY MAPPING USING HIGH PERFORMANCE ENTERPRISE COMPUTING SYSTEM

(71) Applicants: Indian Institute of Technology Bombay, Powai, Mumbai, Maharashtra (IN); Tata Consultancy Services Limited, Mumbai, Maharashtra (IN)

(72) Inventors: Surya Prakash, Mumbai (IN); Sirshendu Arosh, Mumbai (IN); Soumitra Keshari Nayak, Mumbai (IN); Siddhartha Prakash Duttagupta, Mumbai (IN); Subhashri Duttagupta, Mumbai (IN); Manoj Karunakaran Nambiar, Mumbai (IN)

(73) Assignees: Indian Institute of Technology Bombay, Mumbai (IN); Tata Consultancy Services Limited, Mumbai (IN)

( * ) Notice: Subject to any disclaimer, the term of this patent is extended or adjusted under 35 U.S.C. 154(b) by 137 days.

(21) Appl. No.: 15/090,107

(22) Filed: Apr. 4, 2016

(65) Prior Publication Data

US 2016/0291655 A1    Oct. 6, 2016

(30) Foreign Application Priority Data

Apr. 4, 2015    (IN) .......................... 1426/MUM/2015

(51) Int. Cl.
*G06F 1/20*    (2006.01)
*G06F 1/32*    (2006.01)

(52) U.S. Cl.
CPC .............. *G06F 1/206* (2013.01); *G06F 1/324* (2013.01); *G06F 1/3296* (2013.01); *Y02D 10/126* (2018.01)

(58) Field of Classification Search
CPC ........ G06F 1/206; G06F 1/324; G06F 1/3296; Y02B 60/1217

See application file for complete search history.

(56) References Cited

U.S. PATENT DOCUMENTS

| | | | |
|---|---|---|---|
| 5,105,372 A | 4/1992 | Provost et al. |
| 7,486,513 B2 | 2/2009 | Hall et al. |
| 7,869,928 B2 | 1/2011 | von Hoff et al. |
| 8,689,861 B2 | 4/2014 | Campbell et al. |
| 8,751,057 B2 | 6/2014 | Tan |

(Continued)

FOREIGN PATENT DOCUMENTS

| | | |
|---|---|---|
| WO | 1998001409 A1 | 2/1998 |
| WO | 2012021631 A2 | 2/2012 |

OTHER PUBLICATIONS

Abishai D and Ahuja N, "Impact of data center cooling strategies on component reliability," Semiconductor Thermal Measurement and Management Symposium (SEMI-THERM), 30th Annual. IEEE, 2014.

(Continued)

*Primary Examiner* — Fahmida Rahman
(74) *Attorney, Agent, or Firm* — Pepper Hamilton LLP

(57) ABSTRACT

The present disclosure discloses a method and system for non-uniform intensity mapping using a high performance enterprise computing system with enhanced precision cooling, enabling extended over-clocking and over-voltage operation. A Kalman filter embedded in the processor predicts and corrects the input data flux for real-time use by taking care of over-clocking and over-voltage.

10 Claims, 7 Drawing Sheets

(56) References Cited

U.S. PATENT DOCUMENTS

| | | | |
|---|---|---|---|
| 8,751,212 | B2 | 6/2014 | Inoue |
| 8,754,589 | B2 | 6/2014 | Chemel et al. |
| 8,755,945 | B2 | 6/2014 | Zuili et al. |
| 8,755,948 | B2 | 6/2014 | Bower et al. |
| 8,830,672 | B2 | 9/2014 | Alshinnawi |
| 8,838,277 | B2 | 9/2014 | Schuster et al. |
| 8,909,384 | B1 | 12/2014 | Beitelmal et al. |
| 2004/0262409 | A1 | 12/2004 | Crippen et al. |
| 2007/0038414 | A1 | 2/2007 | Rasmussen et al. |
| 2010/0122540 | A1 | 5/2010 | Taras et al. |
| 2012/0071076 | A1 | 3/2012 | Wei et al. |
| 2013/0293114 | A1* | 11/2013 | Tipirneni ............ H05B 33/086 315/151 |
| 2014/0020885 | A1 | 1/2014 | Chainer et al. |
| 2015/0000889 | A1* | 1/2015 | Bellamkonda .......... G06F 1/206 165/287 |
| 2015/0153807 | A1* | 6/2015 | Hao ........................ G06F 1/325 713/320 |
| 2016/0129280 | A1* | 5/2016 | Douglas ............... A61N 5/0618 607/88 |

OTHER PUBLICATIONS

Anagnostopoulos C, Odysseas S and Stathes H; "Context fusion: dealing with sensor reliability." Mobile Adhoc and Sensor Systems, IEEE Internatonal Conference on. IEEE, 2007.

Arnaud D (2008) A Tutorial on Particle Filtering and Smoothing: Fifteen years later. http://www.cs.ubc.ca/~arnaud/doucet_johansen_tutorial.pdf [Last Link Access on Dec. 15, 2014 ].

Aurilio G, Balato M, Graditi G, Landi C, Luiso M, and Vitelli M, "Fast Hybrid MPPT Technique for Photovoltaic Applications: Numerical and Experimental Validation," Advances in Power Electronics, 2014.

Dzung N and Lehman B, "An Adaptive Solar Photovoltaic Array Using Model Based Reconfiguration Algorithm," Industrial Electronics, IEEE Transactions on, vol. 55, No. 7, pp. 2644-2654, Jul. 2008.

Khosrow E, Jones GF and Fleischer AS, "A review of data center cooling technology, operating conditions and the corresponding low-grade waste heat recovery opportunities," Renewable and Sustainable Energy Reviews, 31, pp. 622-638, 2014.

Eom KH, Lee SJ, Kyung YS, Lee CW, Kim MC and Jung KK;"Improved Kalman filter method for measurement noise reduction in multi sensor RFID systems," Sensors, 11(11), pp. 10266-10282, 2011.

Esram T and Chapman PL, "Comparison of Photovoltaic Array Maximum PowerPoint Tracking Techniques," Energy Conversion, IEEE Transactions on, vol. 22, No. 2, pp. 439-449, Jun. 2007.

Ganti V, "Smart Grid as a Driver for Energy-Intensive Industries: A Data Center Case Study",Grid-Interop, Irving, TX, Dec. 3-6, 2012.

Huawei G, Shi W, and Deng Y, "Evaluating sensor reliability in classification problems based on evidence theory." Systems, Man, and Cybernetics, Part B: Cybernetics, IEEE Transactions on 36.5: 970-981, 2006.

Intel Corporation (2014), Corei7-4760HQ Processor http://ark.intel.com/prod-ucts/76090/Intel-Core-i7-4760HQ-Processor-6M-Cache-up-to-3_30-GHz [Last Link Access on Dec. 15, 2014].

Kraus AD and Avram B-C, "Thermal analysis and control of electronic equipment," Washington, DC, Hemisphere Publishing Corp., 633 p. 1, 1983.

Patnaik B, Sharma P, Trimurthulu E, Duttagupta SP and Agarwal, V, "Reconfiguration strategy for optimization of solar photovoltaic array under non-uniform illumination conditions," Photovoltaic Specialists Conference (PVSC), 37th IEEE, pp. 001859-001864, Jun. 2011.

Petrone G, Ramos-Paja CA, Spagnuolo G and Vitelli M "Granular control of photovoltaic arrays by means of a multi-output Maximum Power Point Tracking algorithm," Progress in Photovoltaics: Research and Applications, 21(5), pp. 918-932, 2011.

Rauschenbach HS (1971), "Electrical output of shadowed solar arrays," Electron Devices, IEEE Transactions on, vol. 18, No. 8, pp. 483-490, Aug. 1971.

Ribeiro M (2004), Kalman and Extended Kalman Filters: Concept, Derivation and Properties http://citeseerx.ist.psu.edu/viewdoc/download?doi=10.1.1.214.809&rep=rep1&type=pdf [Last Link Access on Dec. 15, 2014].

Sanyo (2012), HIT-H250E01 http://www.evoenergy.co.uk/wp-content/uploads/2012/05/Datasheet-HIT-250W.pdf [Last Link Access on Dec. 15, 2014].

Welch G (2006) An Introduction to the Kalman Filter http://www.cs.unc.edu/~welch/media/pdf/kalman_intro.pdf [Last Link Access on Dec. 15, 2014].

Xilinx (2014), Xilinx Power Estimator http://www.xilinx.com/products/design_tools/logic_design/xpe.htm [Last Link Access on Dec. 15, 2014].

Xilinx (2016), Xilinx Power Estimator http://www.xilinx.com/products/technology/power/xpe.html [Last Link Access on Aug. 4, 2016].

Ze C, Zhichao P, Yanli L, Peng X, "An adaptive solar photovoltaic array reconfiguration method based on fuzzy control," Intelligent Control and Automation (WCICA), 8th World Congress, pp. 176-181, Jul. 7-9, 2010.

Zhang H, Shao S, Xu H, ZouH and Tian C, Free cooling of data centers: A review. Renewable and Sustainable Energy Reviews, 35, 171-182, 2014.

Zied E, Mellouli K, and Smets P, "Assessing sensor reliability for multisensor data fusion within the transferable belief model." Systems, Man, and Cybernetics, Part B: Cybernetics, IEEE Transactions on 34.1: 782-787, 2004.

O'Hagan (2002) O'Hagan WJ, McKenna M, Sherrington DC, Rolinski OJ and Birch DJS, "MHz LED source for nanosecond fluorescence sensing" 13 (2002) 84-91.

WuC et al. (2008), "Study on automatic sun-tracking technology in PV generation," Electric Utility Deregulation and Restructuring and Power Technologies, 2008. DRPT2008. Third International Conference on, pp. 2586-2591, Apr. 6-9, 2008.

\* cited by examiner

NON-UNIFORM INTENSITY MAPPING USING HIGH PERFORMANCE ENTERPRISE COMPUTING SYSTEM

CROSS REFERENCE TO RELATED APPLICATIONS

This application claims priority to Indian Patent Application No. 1426/MUM/2015, filed Apr. 4, 2015, the entire contents of which is hereby incorporated by reference herein.

FIELD OF INVENTION

The present disclosure relates generally to non-uniform intensity mapping, and more specifically to non-uniform intensity mapping using a high performance enterprise computing system with enhanced precision cooling, enabling extended over-clocking and over-voltage operation.

BACKGROUND OF THE INVENTION

Imaging application in computing systems requires wide-area sensitivity, fine resolution, and ultra-fast estimation of non-uniform intensity (NUI) profile of the incident electromagnetic beam. High data flux requires higher frequency to complete the imaging application in a computing system. The data flux levels are application specific and can range from Giga-FLOP (fluorescence sensing for heavy metal ions) to Peta-FLOP (3-D equipment imaging). There is a widespread domain utility for NUI mapping (2-D and 3-D) in remote sensing (airborne, underwater and subsurface applications), biological and environmental testing (bio organism populations or trace concentration of impurities in water), system health monitoring (industrial and healthcare equipment) and for power management (ultra-mega solar photo voltaic systems). The problem persisting in the prior art is over-heating arising from over-clocking and over-voltage. It makes the system slow and produces undesired results.

With rapid development in computational and processing capabilities of modern computers, the need for an efficient and intelligent cooling mechanism for such high-end computing machines has also increased. Cooling systems are used to dissipate heat or reduce the temperatures of processor and other components of the machine so as to prevent the machine from potential damage. There are umpteen research works with respect to cooling technologies for personal and commercial computers. Existing technology uses fans or occasionally water cooling through rigid or flexible pipes. Air blown through fans is the most traditional way of cooling, but has the risk of exposing the machine and its vital components to the accumulation of dust. Water cooling may yield better results than fans, but a leakage may cause short circuits and permanent failure of electronic components. There is also some research on sensing the temperature of components and thereby controlling actuators to control the cooling.

Existing technologies are reactionary or reactive to the increment in temperature and may also provide a steady cooling system irrespective to requirements of the computing system. A cooling apparatus and method for a high performance computing system that precisely keeps the temperature of the components of the system including a processor below threshold is required. Particularly, there is a need for a cooling system which can predict the amount of data required to be processed in future and can also predict the amount of frequency to be increased for optimum performance with increased data, and provides a resultant release of coolant proactively to keep the system cool without drawing much more power than existing technologies.

SUMMARY OF THE INVENTION

This summary is provided to introduce aspects related to a non-uniform intensity mapping using high performance enterprise computing system and the aspects are further described below in the detailed description. This summary is not intended to identify essential features of the claimed subject matter, nor is it intended for use in determining or limiting the scope of the claimed subject matter.

In an implementation of the present subject matter, a method is disclosed for non-uniform intensity mapping. The method may comprise capturing an input flux. The input flux may pertain to a plurality of intensities of incident light on a plurality of photo sensitive modules. The plurality of intensities of incident light may be sensed using a plurality of sensors. The method for non-uniform intensity mapping may further comprise receiving the input flux by a processor. Further, a boundary for each of the intensity of incident light from the plurality of intensities of incident light may be estimated. The estimation may be performed using the processor. Further, the boundary may be mapped with respect to the respective plurality of photo sensitive modules. The method may further comprise simultaneous predication and correction of the input flux using a Kalman filter embedded in the processor, using a plurality of air direction sensors, a plurality of photo sensors, and a plurality of temperature sensors, wherein the photo sensors and the temperature sensors calibrate to each other and both together calibrate the photo sensitive modules for permanent shadow/age effect. The method may further comprise incorporation of a cooling unit to cool and maintain the temperature of the processor.

In another implementation of the present subject matter, a method is disclosed for cooling a processor. The method may comprise determining current load of input flux on the processor. The method may further comprise estimating expected input flux based on historical data. The method for cooling the processor may comprise determining over-clock requirement for the processor. Further, a temperature of the processor may be compared with a predefined threshold value. Further, the temperature may be maintained within a range of the predefined threshold.

In yet another implementation, a system for non-uniform intensity mapping may be disclosed. The system may comprise a processor configured to perform resource intensive computation. The processor may further be communicably coupled to a photo sensor network. The photo sensor network may comprise a plurality of photo sensitive modules. The system may further comprise a Kalman filter. The Kalman filter may be embedded into the processor. Further, the Kalman filter may be configured to determine an input flux. Further, the system may comprise a cooling unit configured to control a current temperature of the processor based on the input flux determined by the Kalman filter.

BRIEF DESCRIPTION OF THE DRAWINGS

The detailed description is described with reference to the accompanying figures. The same numbers are used throughout the drawings to refer to like features and components.

DETAILED DESCRIPTION OF THE INVENTION

Figure 1:
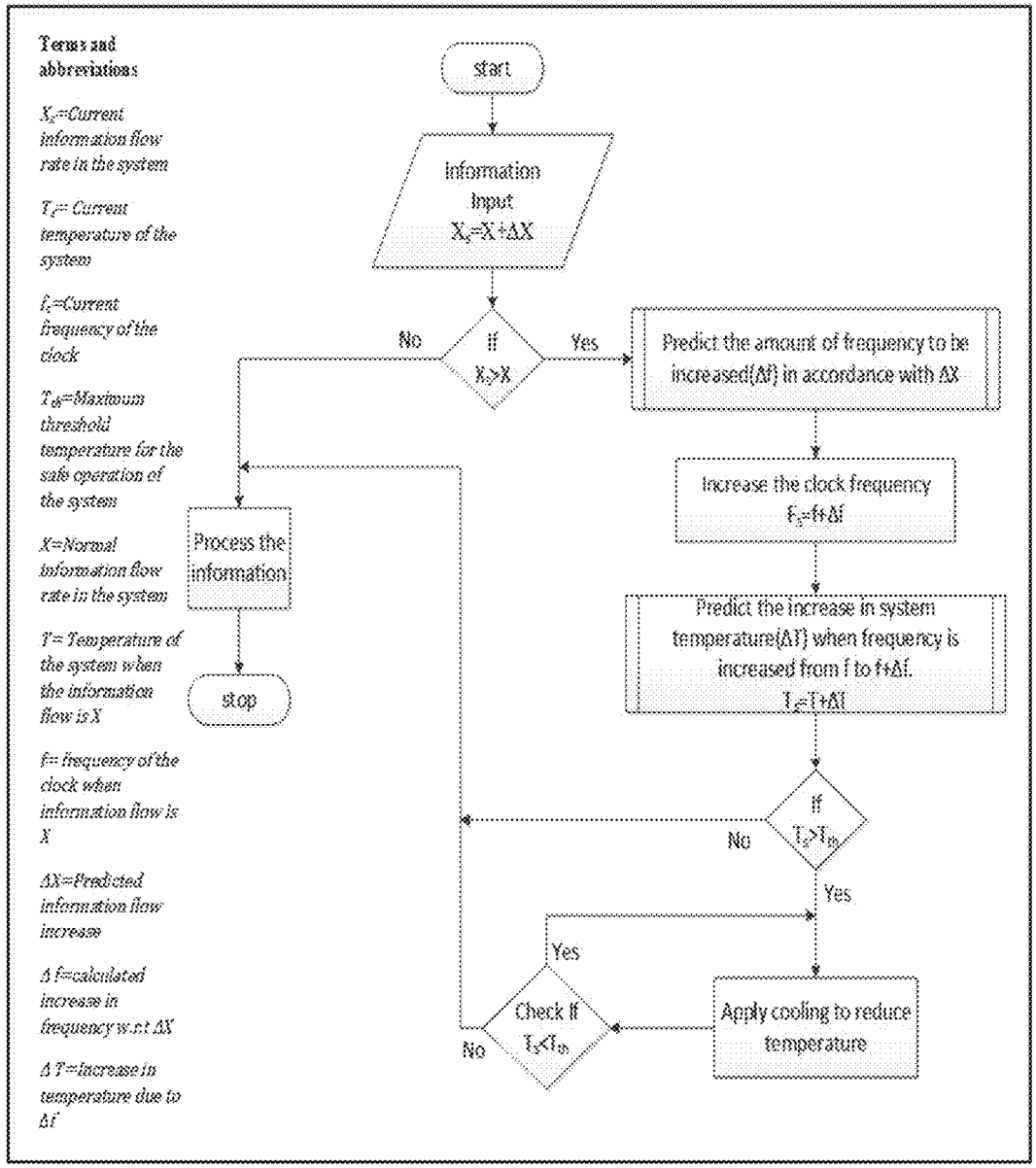
FIG. 1 shows a detailed flow chart of dynamic thermal management in accordance with an embodiment of the present disclosure.

The present disclosure describes a novel system and associated method of enabling extended over-clocking and over-voltage operation of a high performance enterprise computing system (HPECS) through precision cooling architectures disclosed herein.

According to an exemplary embodiment of the present disclosure, a system and associated method to enhance the processor performance of a high performance enterprise computing system (HPECS) by enabling extended over-clocking and over-voltage operation through one of the precision cooling architectures for handling large and variable computational loads is disclosed. The present disclosure may use two-dimensional or three-dimensional Non-uniform Intensity (2-D/3-D NUI) patterns to be estimated by HPECS. One of the embodiments of the present disclosure comprises a HPECS for computation, a two-dimensional display unit, a Photo Sensor Network (PSN) containing umpteen sensors located on a grid for sensing/monitoring of incident intensity generated by two-dimensional Programmable Intensity Pattern Generator (2-D PIPG), a Feedback Switching Network (FSN) that responds to feedback control signal, a Kalman Filter Bank (KFB) for de-noising and prediction of change in operating frequency, voltage and temperature, and a Precision Cooling Unit (PCU) for dynamic thermal management. The HPECS operates in an overclocking mode for unconstrained processing of the large variable data flux or input flux. Accordingly, there is an increase in processor temperature, which can result in system malfunctioning in the presence of heat flux transients as well as long-term reliability problems. The PCU, then, stabilizes the processor temperature to a pre-defined threshold and enables the overclocked operation for enhanced system performance. The present disclosure also proposes two types of cooling architectures, which are (a) Proximity Cooling where the HPECS is in direct contact with the cooling system and (b) Remote Cooling where the HPECS is remotely connected with the cooling system through heat pipes. In another embodiment, a LED driver circuit scheme, operable at 10 Mega Hertz frequency may be used, so as to enable the PIPG emulator to broadcast 10 nanosecond photonic pulses. As the computational load fed into HPECS changes, the operating frequency and/or voltage increases, which results in a proportionate increase in processor temperature, which is, then, neutralized by dynamic thermal management through PCU. The dynamic thermal management requires feedback from a highly sensitive, distributed temperature sensor array represented by PSN.

The operating frequency (instruction per second) of a computing system should be increased in order to increase or enhance its operational performance. The increase in operating frequency in turn increases the instruction cycles and increases voltage and temperature of the HPECS. In order to maintain higher operating performance of computing as well as low temperature, precision cooling is employed. In an exemplary embodiment of a Solar Power Plant comprising solar PV cells, the response of Photo Sensor Network (PSN) varies in accordance with the incident light intensity. Output from the PSN is processed through a high performance enterprise computing system (HPECS). Kalman Filter Bank (KFB), used as a sub-system of the HPECS, monitors the health of photo sensors, de-noises the output of the PSN, and essentially predicts a change in incident light intensity.

FIG. 1 shows a detailed flow chart of the dynamic thermal management protocol for an HPECS or a processor configured to perform resource intensive computation. In accordance with the present disclosure, the flow chart details the process wherein the system predicts the quantum of frequency to be increased/over-clocking requirement to enhance the computational performance of the processor in the event of increment in input flux (information). As the processor operating frequency is increased (over-clocking) to maintain the performance, an increment in the temperature and voltage of the processor is also observed. In such an event, current temperature of the processor/HPECS is reduced through a cooling unit to maintain its extended overclocked and over-voltage performance. The prediction of the amount of input flux may be determined by a Kalman filter using a plurality of air direction sensors, a plurality of photo sensors, and a plurality of temperature sensors, wherein the photo sensors and the temperature sensors calibrate to each other and both together calibrate photo sensitive modules for permanent shadow/age effect. The Kalman filter may be embedded in the processor.

Figure 2:
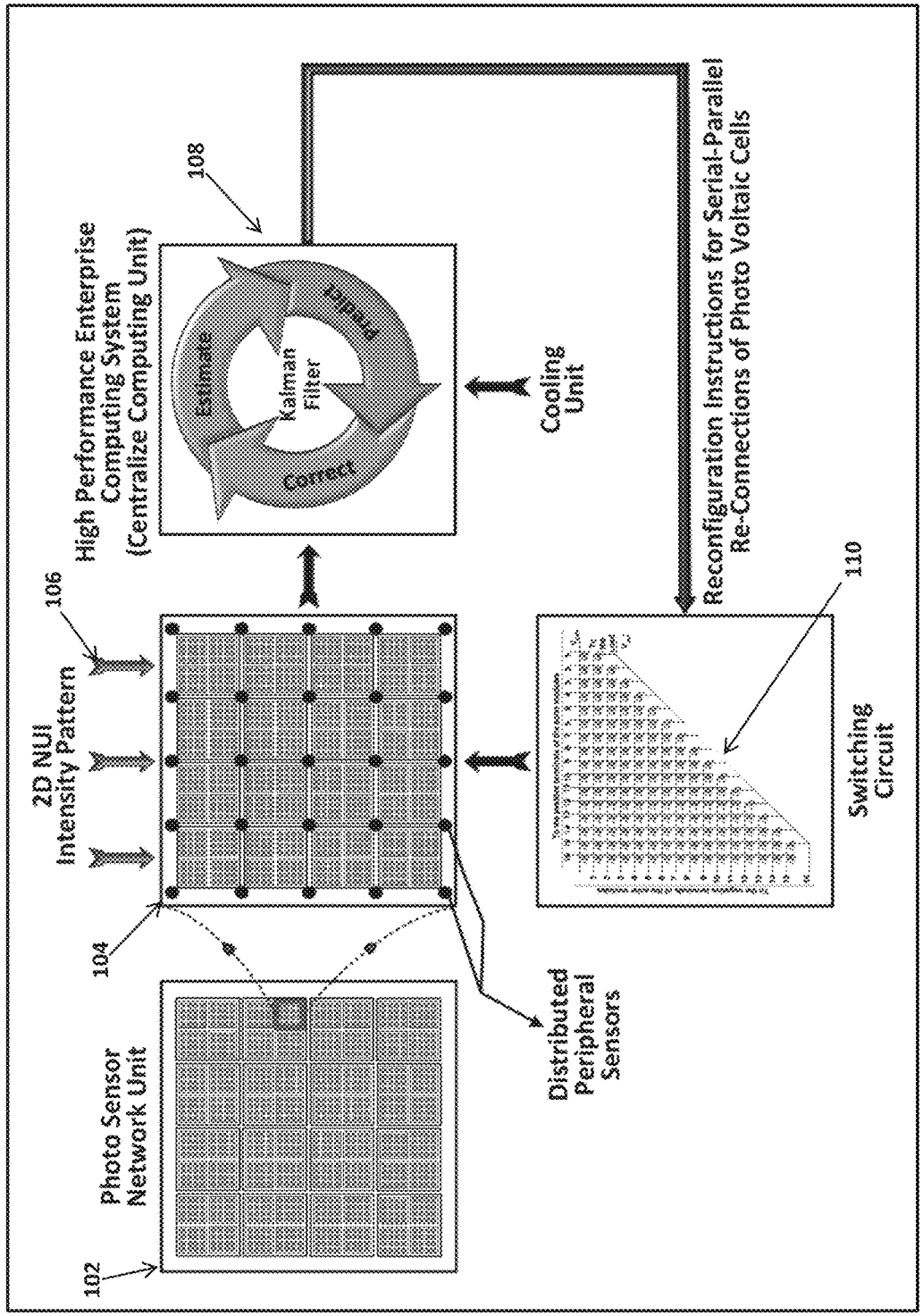
FIG. 2 illustrates an exemplary embodiment in accordance with the present disclosure.

Referring to FIG. 2, an exemplary embodiment in accordance with the present disclosure is illustrated. According to the exemplary embodiment of FIG. 2, a photo sensor network 102 may comprise a plurality of photo sensitive modules. Further, a plurality of sensors 104 may be positioned close to the plurality of photo sensitive modules. The plurality of sensors 104 may be configured to capture a plurality of intensities of incident light on the photo sensor network 102. Data captured pertaining to the plurality of intensities of incident light may be defined as input flux, as a huge amount of data may be generated and captured from the plurality of sensors 104. The input flux may change based on variation in the intensity of the incident light on each sensor from the plurality of sensors 104. The input flux may provide a real-time update on the changing intensity of incident light. The plurality of sensors may detect/sense two dimensional non-uniform intensity (2-D NUI) 106 patterns or three dimensional non-uniform intensity (3-D NUI) created over the photo sensor network 102.

The input flux may be received by a processor 108. The processor may be a centralized high performance enterprise computing system (HPECS), a distributed computing system, or a standalone computing system. Further, according to an exemplary embodiment, a Kalman Filter is disclosed, wherein the Kalman Filter processes and de-noises the input flux and may send instructions to Feedback Switching Network (FSN) or Switching Circuit 110 to reconfigure the photo sensor network 102. For example, an array of solar panel connected in a parallel connection may be reconnected in a series connection in order to obtain maximum power.

The Kalman Filter may further be configured to monitor the health of plurality of sensors 104 and also predict or correct input flux by mapping with historical input flux. With real-time and dynamic capturing of input flux and receiving by the processor 108, operating frequency and/or voltage of the processor 108 may increase to compensate for the added computation. To compensate for the added computation, the processor 108 may be required to be over-clocked, in-turn increasing operating temperature of the processor 108. To maintain the current temperature of the processor 108 within a pre-defined threshold, dynamic thermal management protocol as described in FIG. 1 may be implemented.

Figure 3:
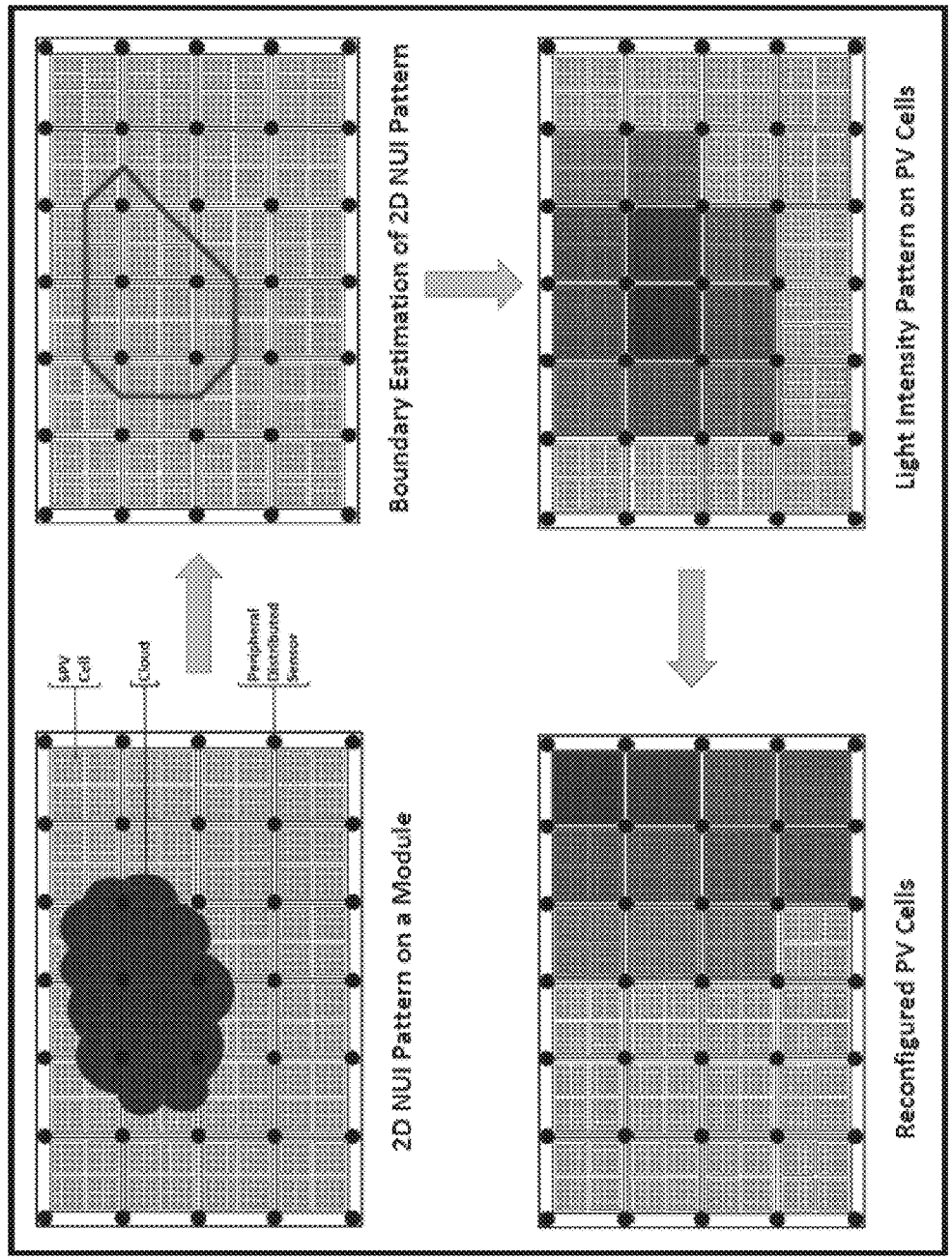
FIG. 3 is an illustration of intensity mapping in accordance with an embodiment of the present disclosure.

FIG. 3 is an illustration of intensity mapping in accordance with the present disclosure. The intensity mapping may be illustrated using an example of an array of solar modules. The array of solar modules may be represented as a grid. The grid as illustrated may comprise a plurality of sensors. An object, for e.g. a cloud, may pass over the grid of solar modules. The plurality of sensors may detect and capture the intensity of incident light on the grid. The detected and captured intensities may be transmitted to a processor as input flux. The processor may then estimate a boundary or the 2-D NUI pattern created and map the boundary with respect to the respective solar modules from the grid. The processor may then process the input flux containing 2-D NUI pattern information and instruct the FSN to reconfigure the connections of the solar modules in the grid. From FIG. 3 it may be observed that before reconfiguration, there were only two complete columns which were connected and the remainder were switched off even if only an edge of the object was falling upon the solar module. After reconfiguration, there are three complete columns which are connected, providing maximum possible power.

Figure 4:
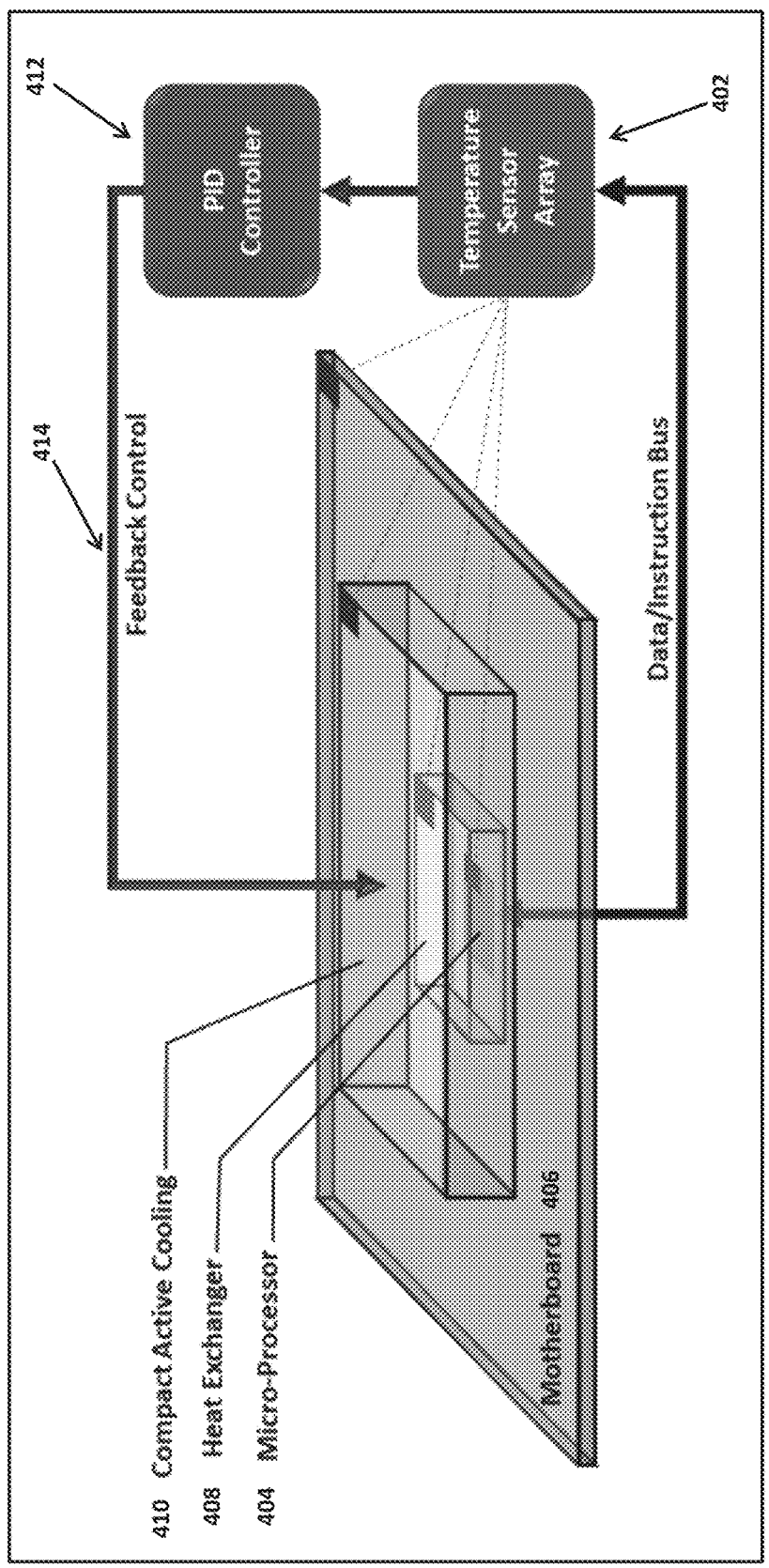
FIG. 4 illustrates a cooling architecture in accordance with an embodiment of the present disclosure.
Figure 5:
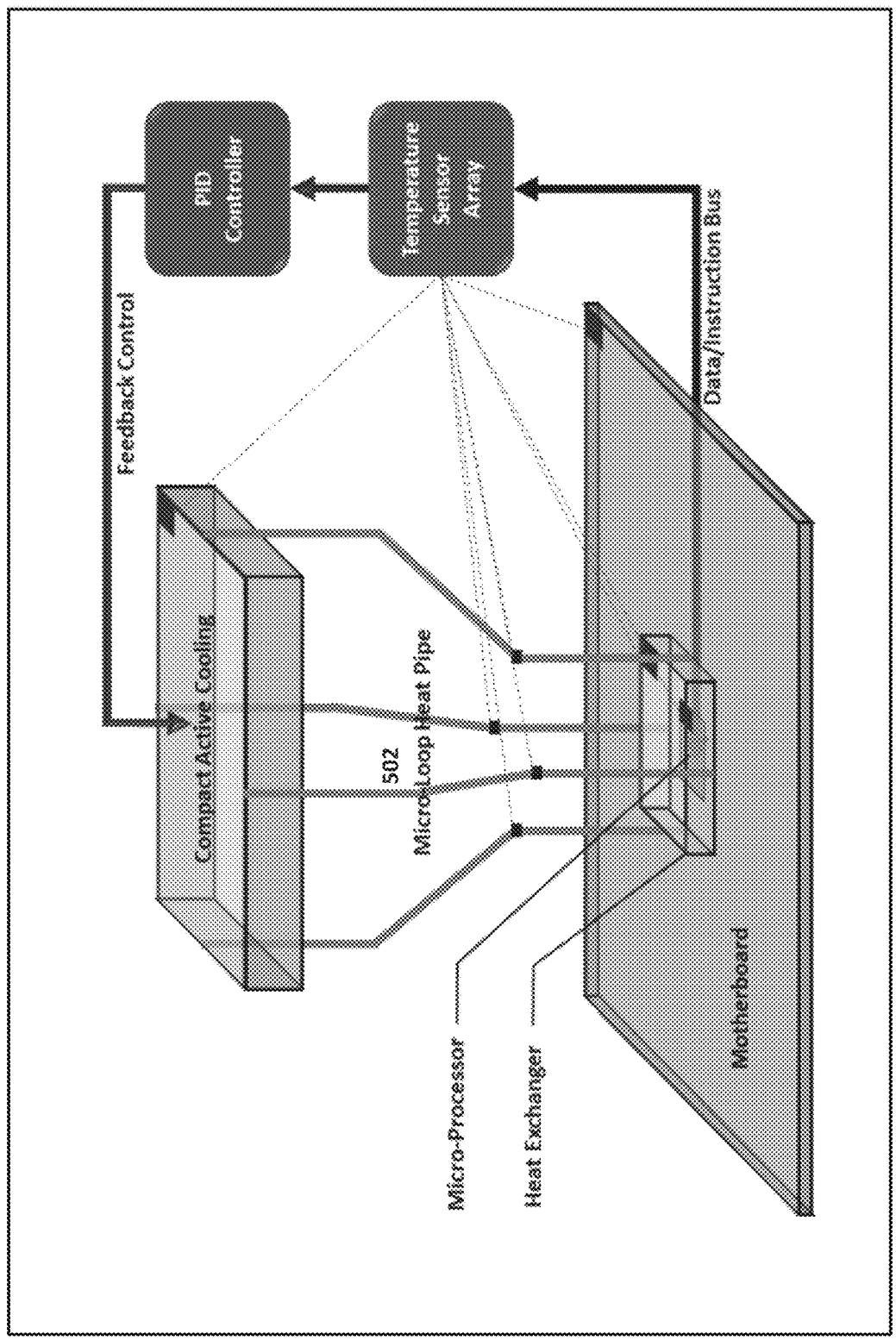
FIG. 5 illustrates a cooling architecture in accordance with an embodiment of the present disclosure.

FIG. 4 and FIG. 5 illustrates a cooling architecture in accordance with embodiments of the present disclosure. The cooling architecture disclosed may use Liquid Nitrogen (LN2) as a coolant to achieve effective dynamic thermal management. The cooling unit may be comprised of a temperature sensor array 402. The temperature sensor array 402 may be configured to sense temperatures of a processor 404 and various components. Further, in an exemplary embodiment, individual temperature sensors may be placed on the processor 404, a motherboard 406, a heat exchanger 408 and cooling components 410. The temperature sensor array 402 may send current temperature data to the processor 402. The processor 402 may in turn send instruction to a Proportional-Integral-Derivative (PID) 412 controller of the quantity (ml/min) of coolant to be released for compact active cooling. Further, a Feedback control system 414 may maintain the processor within the predefined temperature threshold for enhanced performance. Further the cooling unit may comprise a network of heat pipes 502 for cooling the processor 404 as illustrated in FIG. 5.

Figure 6:
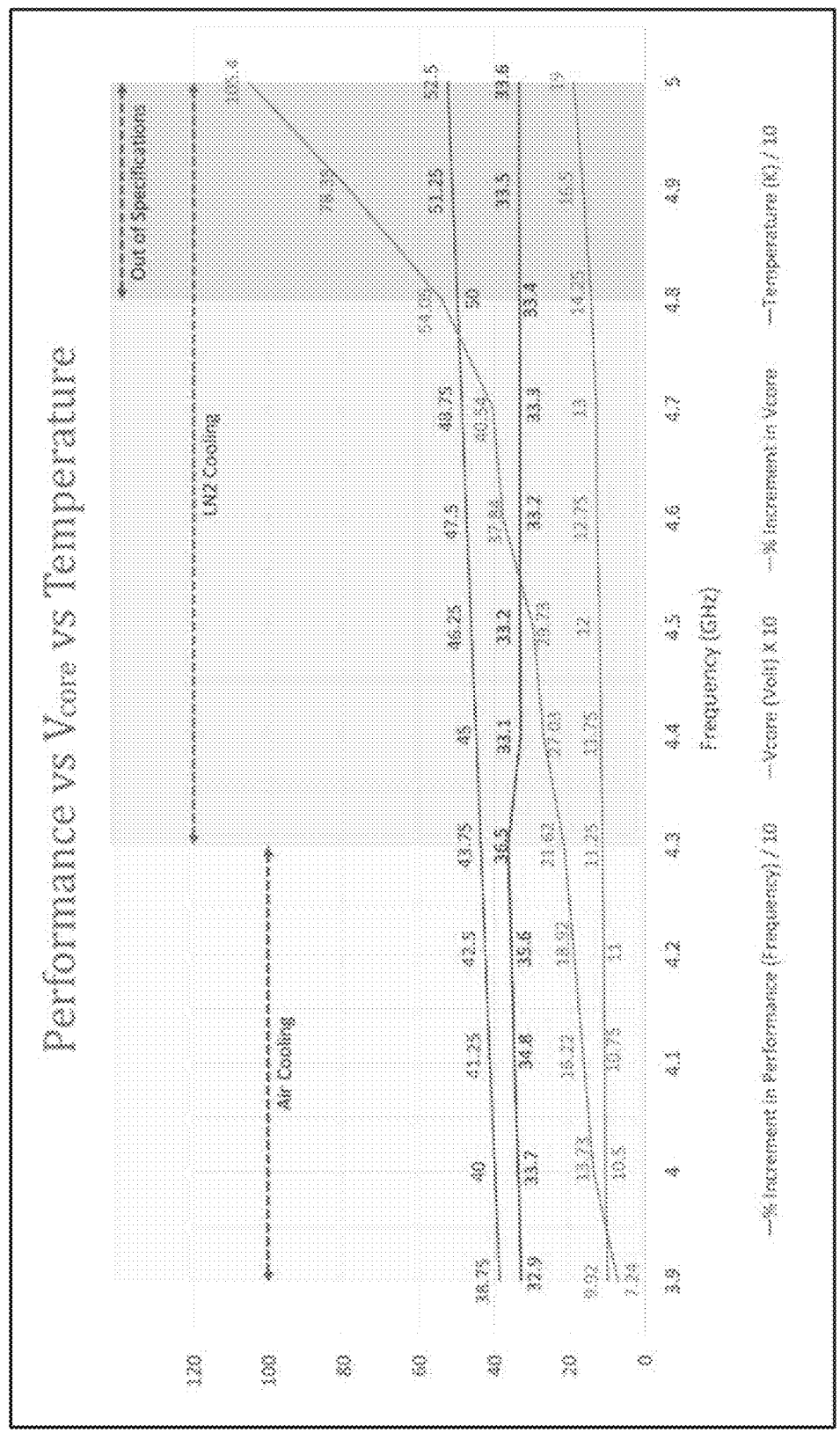
FIG. 6 illustrates a graph of Operating Frequency-Voltage-Temperature in accordance with an embodiment of the present disclosure.

FIG. 6 illustrates a graph of Operating Frequency-Voltage-Temperature. It clearly shows steady improvement in performance as the operating frequency increases when the processor is cooled by Liquid Nitrogen (LN2) using cooling architectures as disclosed. As shown, the increment in voltage is also not substantial.

Figure 7:
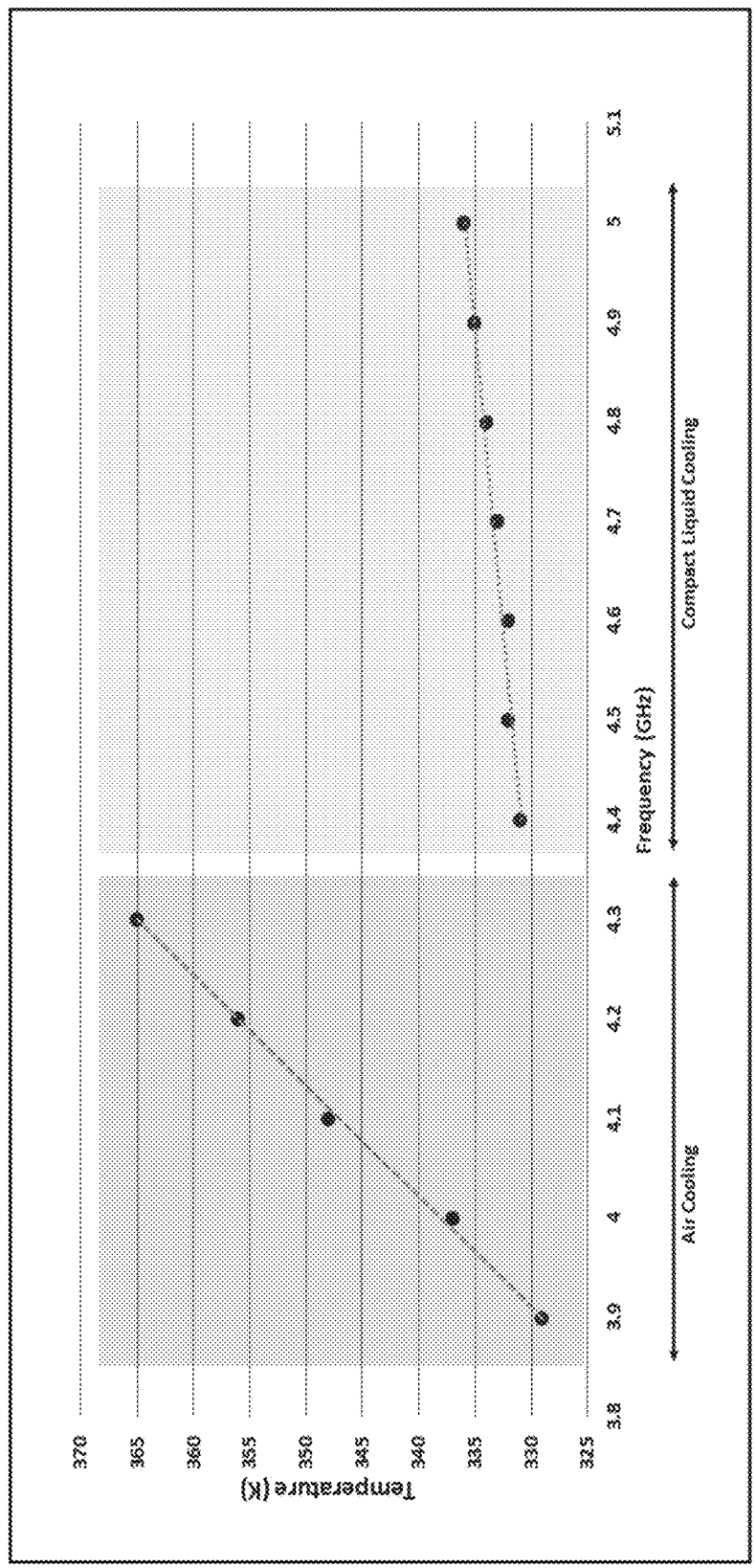
FIG. 7 illustrates a Temperature-Frequency graph in accordance with an embodiment of the present disclosure.

FIG. 7 illustrates a Temperature-Frequency graph in accordance with an embodiment of the present disclosure. The graph shows the increment of the processor temperature in case of air cooled system and liquid cooled system of the present disclosure. During the conventional cooling through 'air', there is a linear increase in temperature, which may reach up to 365 K at an operating frequency of 4.3 Giga Hertz (GHz). In conventional 'air' cooling, the processor is used in operating frequency range from 3.9 GHz to 4.3 GHz; above said frequency range the temperature of the processor goes in the High Temperature band. In another instance where the processor is cooled by the method and system as disclosed in the present disclosure through Liquid Nitrogen (LN2) as a coolant, the increment in temperature of the processor is within the range of 313 K to 338 K at the operating frequency that may reach up to 5 GHz.

The above description along with the accompanying drawings is intended to describe the preferred embodiments of the invention in sufficient detail to enable those skilled in the art to practice the invention. The above description is intended to be illustrative and should not be interpreted as limiting the scope of the invention. Those skilled in the art to which the invention relates will appreciate that many variations of the described example implementations and other implementations exist within the scope of the claimed invention.

What is claimed is:

1. A method for cooling a processor, the method comprising:
    determining current load of input flux on the processor, using a non-uniform intensity mapping, wherein a plurality of photo sensitive modules are configured to capture a plurality of intensities of incident light;
    simultaneously predicting and correcting the input flux using a Kalman filter and mapping with historical data;
    calibrating dynamically in real-time a plurality of air direction sensors, a plurality of photo sensors, and a plurality of temperature sensors, wherein the photo sensors and the temperature sensors calibrate each other, and the photo sensors and the temperature sensors together calibrate the photo sensitive modules;
    determining that the processor is over-clocked according to an over-clock requirement for the processor based on the predicted and corrected input flux; and
    cooling the over-clocked processor to maintain temperature within a threshold by sending instruction to a Proportional-Integral-Derivative (PID) controller for a quantity of coolant to be released.

2. The method of claim 1, further comprises comparing the current load of input flux and expected input flux, wherein the expected input flux is based on the corrected input flux and mapped historical data.

3. The method of claim 1, wherein changing input flux changes an operating frequency of a LED driver circuit connected with the processor, thereby changing broadcast of the plurality of intensities of the incident light of the LED.

4. The method of claim 1, further comprises using the plurality of photo sensors to capture the plurality of intensities on the plurality of photo sensitive modules, to map non-uniform intensity.

5. A system for non-uniform intensity mapping for cooling a processor, the system comprising:
    a processor configured to perform resource intensive computation;
    a photo sensor network communicably coupled to the processor, wherein the photo sensor network comprises a plurality of photo sensitive modules configured to capture a plurality of intensities of incident light;
    a plurality of photo sensors and a plurality of temperature sensors, wherein the photo sensors and the temperature sensors calibrate each other, and the photo sensors and the temperature sensors together calibrate the photo sensitive modules;

a Kalman filter embedded into the processor configured to determine an input flux using a non-uniform intensity mapping and the captured plurality of intensities of incident light; and a cooling unit configured to control a current temperature of the processor based on the input flux determined by the Kalman filter.

6. The system of claim 5, further comprises a plurality of sensors configured to capture a plurality of parameters in the photo sensor network.

7. The system of claim 6, wherein the plurality of sensors are selected from at least one of a light sensor, an air sensor, a humidity sensor, a temperature sensor, or a wind direction sensor.

8. The system of claim 5, wherein the plurality of sensors are configured to capture an intensity of incident light on the photo sensor network.

9. The system of claim 5, wherein the processor is further configured to process at a required frequency based on the input flux.

10. The system of claim 1, wherein the cooling unit further comprises:

a plurality of temperature sensors mounted in proximity to the processor, wherein the plurality of temperature sensors are configured to detect the current temperature; and a Proportional-Integral-Derivative controller to control flow of coolant to the processor based on the current temperature detected.

\* \* \* \* \*